Patented Dec. 9, 1941

2,265,450

UNITED STATES PATENT OFFICE 2,265,450

POLYMERIC N-VINYL LACTAMS AND PROCESS OF PRODUCING SAME

Walter Reppe and Curt Schuster, Ludwigshafen-on-Rhine, and Adolf Hartmann, Mannheim, Germany, assignors to I. G. Farbenindustrie Aktiengesellschaft, Frankfort - on - the - Main, Germany No Drawing. Application May 28, 1940, Serial No. 337,661. In Germany January 16, 1939

8 Claims. (Cl. 260—85)

The present invention relates to polymeric N-vinyl lactams and a process of producing same.

We have found that N-vinyl lactams, obtainable, for example, from lactams and acetylene in the presence of substances having a strongly basic action as catalysts according to the process of the copending application Serial No. 337,660, filed May 28, 1940, by Walter Reppe, Hans Krzikalla, Otto Dornheim and Rudolph Sauerbier, may be polymerized by treating them with an aqueous solution of a watersoluble neutral sulphite in a neutral or basic medium. The polymerization may be carried out at ordinary or elevated temperature while simultaneously shaking or agitating the reaction mixture. By an addition of emulsifying agents the dispersion and in accordance thereto the polymerization may be favorably influenced. The polymerization may be carried out in the presence of air or inert gases, such as nitrogen.

The polymerization temperatures generally depend on the consistency of the monomeric N-vinyl lactams, i. e. the lactams liquid at ordinary temperature are preferably polymerized at low temperatures, while the solid lactams are preferably polymerized at a higher temperature in a fused state, advantageously with vigorous agitation to bring about dispersion in the sulphite solution. The lactams are thus transformed into viscous or tough amorphous masses, which, after the polymerization and, if desired, after standing for 1 or 2 days, may be separated from the sulphite solution, washed with water and suitably dried. The polymeric N-vinyl lactams thus obtained are colorless horn- or glasslike and sometimes brittle materials possessing a high softening point. Depending on the properties of the monomeric substances they are soluble in water or organic solvents. The solutions foam on shaking and in part possess a high viscosity and sticking power. The polymerized materials are resistant to acids and bases. They are suitable for use as textile assistants and is finishing, thickening, sticking or binding agents. The sulphite solutions may repeatedly be used for new polymerizations.

The following examples serve to illustrate how the present invention may be carried out in practice, but the invention is not restricted to the said examples. The parts are by weight.

Example 1

50 parts of N-vinylpyrrolidone are boiled with a solution of 100 parts of anhydrous neutral sodium sulphite in 500 parts of water for 5 hours under reflux. After 1 day's standing the tough mass formed in a good yield is separated by decanting, rinsed with water and dried.

Example 2

100 parts of N-vinylpyrrolidone are poured in a nitrogen atmoshere into a solution of 100 parts of neutral sodium sulphite in 500 parts of water and vigorously shaken for 24 hours at ordinary temperature. After allowing the mixture to stand for 1 to 2 days, the sulphite solution is separated off, the viscous polymerization product is made up with some water and neutralized in the heat with hydrochloric acid of 15 per cent. strength. The extremely viscous solution thus obtained may be directly used as thickening or sticking agent.

Example 3

30 parts of N-vinylpyrrolidone are added to a solution of 40 parts of neutral potassium sulphite in 200 parts of water and the mixture is vigorously agitated for 24 hours in a nitrogen atmosphere at between 35° to 40° C. After 1 day's standing the polymerization product formed is decanted, dissolved in the equal amount of water and dialyzed for 2 days against running water. The solution is then filtered and evaporated. The polymerization product is obtained in a good yield as a residue in the form of a clear, horn-like mass. Its solutions are neutral.

Example 4

100 parts of N-vinylcaprolactam are dissolved in 2500 parts of water and 500 parts of neutral sodium sulphite are added to the solution while stirring. After 24 hours' stirring at between 30° and 40° C., the N-vinylcaprolactam which first was distributed in the sulphite solution in the form of fine oil droplets, is transformed into a thick sludgy mass. The latter may easily be separated from the sulphite solution and then dried. It is then pulverizable and has a softening point of about 180° C. The polymerization product obtained is soluble in water and alcohol. The solution possesses foaming power.

Example 5

100 parts of N-vinylhexahydrophthalimidine and a solution of 300 parts of neutral sodium sulphite in 1500 parts of water are stirred at 70° C. for 5 to 6 hours. The monomer first contained in the solution in an oily consistency is changed at the end of the polymerization into a thick and sludgy mass which may easily be isolated. The polymerization product is washed several times with fresh water and dried. It is viscous, difficultly soluble in water and distinguished by a good sticking power.

Example 6

200 parts of neutral sodium sulphite are introduced, while stirring, into a solution of 100 parts of N-vinylpiperidone in 1000 parts of water and the mixture thus formed is vigorously stirred at between 45° to 50° C. for 36 hours. The monomer originally contained in the solution as a fine dispersion is thus slowly transformed into a sludgy, viscous mass which forms a coherent film after one day's standing. The film is removed, shortly washed with water and dried. The horn-like mass thus obtained is soluble in water. The aqueous solution is viscous and possesses foaming power.

What we claim is:

1. A process of producing polymeric N-vinyl lactams which comprises treating monomeric N-vinyl lactams with an aqueous solution of a water-soluble neutral sulphite in a from neutral to basic medium.

2. A process of producing polymeric N-vinyl lactams which comprises treating monomeric N-vinylpyrrolidone with an aqueous solution of a water-soluble neutral sulphite in a from neutral to basic medium.

3. A process of producing polymeric N-vinyl lactams which comprises treating monomeric N-vinylcaprolactam with an aqueous solution of a water-soluble neutral sulphite in a from neutral to basic medium.

4. A process of producing polymeric N-vinyl lactams which comprises treating monomeric N-vinylpiperidone with an aqueous solution of a water-soluble neutral sulphite in a from neutral to basic medium.

5. Polymeric N-vinyl lactams.
6. Polymeric N-vinylpyrrolidone.
7. Polymeric N-vinylcaprolactam.
8. Polymeric N-vinylpiperidone.

WALTER REPPE.
CURT SCHUSTER.
ADOLF HARTMANN.